Oct. 23, 1945. S. F. MONROE Re. 22,684
PHOTOGRAPHIC APPARATUS
Original Filed Feb. 24, 1941 2 Sheets-Sheet 1
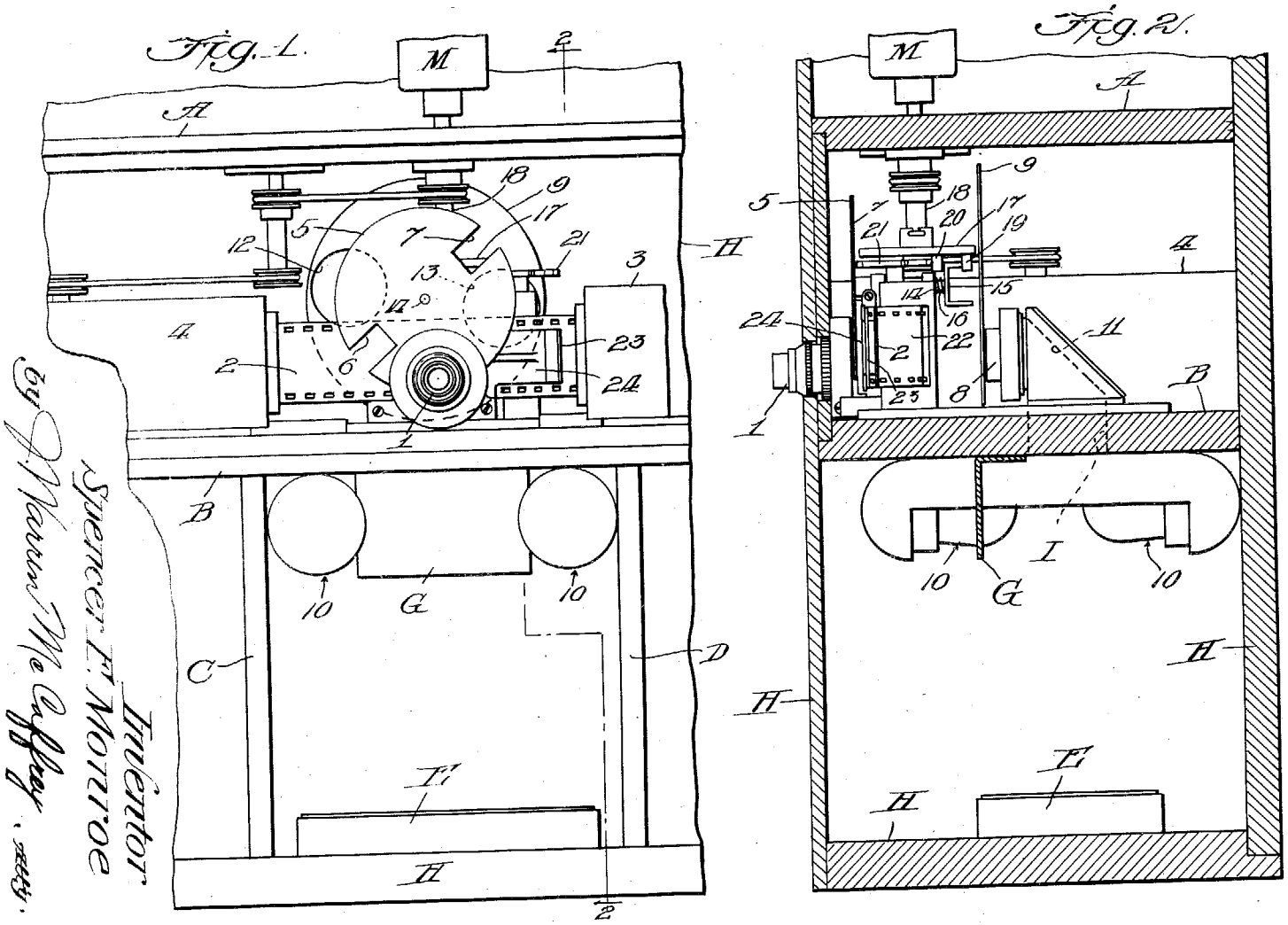

Oct. 23, 1945. S. F. MONROE Re. 22,684
PHOTOGRAPHIC APPARATUS
Original Filed Feb. 24, 1941 2 Sheets-Sheet 2
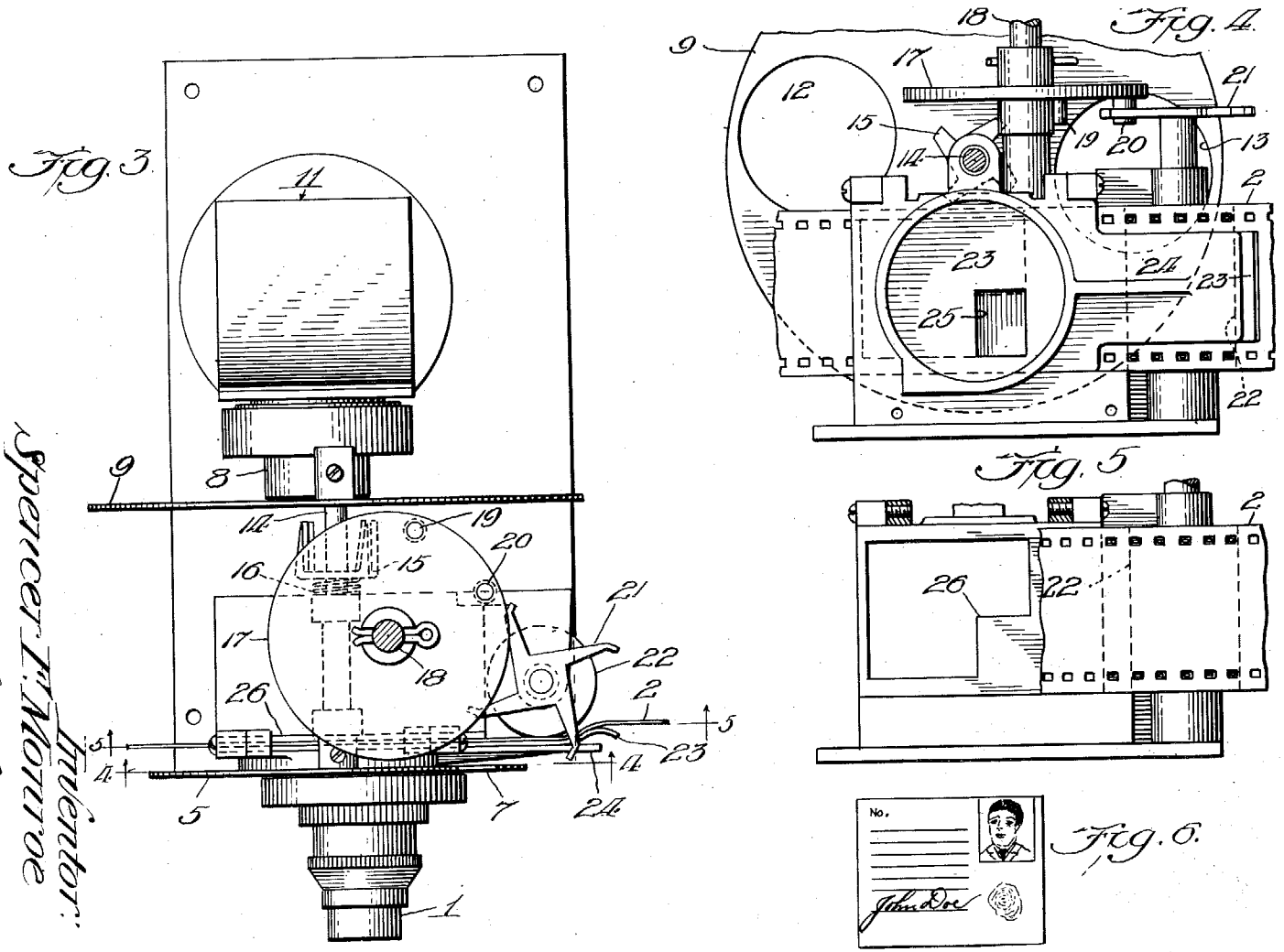
Inventor:
Spencer F. Monroe
by J. Warren McCaffrey Atty Reissued Oct. 23, 1945 Re. 22,684

UNITED STATES PATENT OFFICE 22,684

PHOTOGRAPHIC APPARATUS

Spencer F. Monroe, New York, N. Y., assignor, by mesne assignments, to Harlan W. Yendes and Paul M. Banker Original No. 2,347,749, dated May 2, 1944, Serial No. 380,243, February 24, 1941. Application for reissue October 11, 1944, Serial No. 558,224

13 Claims. (Cl. 95—18)

This invention relates to improvements in photographic apparatus and particularly photographic apparatus of the dual type.

It is among the objects of the present invention to provide a camera capable of impressing the likenesses of two separate and distinct subjects upon a single frame of sensitized material so that a print made from the exposed frame will provide a composite of the separate likenesses in preconceived arrangement.

A further object of the present invention is to provide a camera capable of properly exposing a single frame of sensitized material to photograph two separate and widely contrasting subjects so that the resulting negative will have the proper gamma value, that is, be of the proper density throughout for best printing results.

Another object of the invention is to take a large number or series of identifying photographs including, for example, a brief description of the individual photographed, his personal signature, and if desired, his fingerprint, and any other means of identification that might be wanted on the particular individual being photographed. Such a means of identification would have tremendous practical advantages to licensing bureaus, investigating groups, large industrial establishments, and at the present time as a means to prevent undesirable persons from gaining admittance to plants and offices engaged in the national defense program.

In a specific embodiment the invention comprises a photographic camera having a front lens operated by a front revolving shutter, a container for the unexposed photographically sensitized material, a container for collecting the exposed photographically sensitized material, means for causing the photographically sensitized material to pass from one container to the other behind the front lens and the front revolving shutter, means for blocking off all light rays from the photographically sensitive material excepting those passing through the front lens, another lens operated by another revolving shutter, means for blocking off all light rays from the photographically sensitive material coming into the front lens, a photographic chamber with means therein to hold an object to be photographed in a position so that light is reflected therefrom to a means for deflecting the reflected light rays into one of the lenses of the camera, and means operated by a motor for correlating the operation of the separate shutters and the means for advancing the sensitized film between the shutters and lenses.

The several features of the invention are shown in the accompanying drawings and a description of the invention will be better understood by reference to the several figures illustrated with identifying numerals, as described in the accompanying specification. In describing the apparatus of this invention the same numerals and letters are employed to designate corresponding elements in the several figures illustrated.

Fig. 1 shows a front view of the portion of the camera containing all the component parts of this invention, with the front cover removed.

Fig. 2 is a sectional view in elevation, taken along the broken line 2—2 of Fig. 1.

Fig. 3 is a plan view of the central portion of the camera taken along a plane below the motivating means indicated as M in Fig. 1.

Fig. 4 is a sectional view in elevation taken along the line 4—4 of Fig. 3.

Fig. 5 is a sectional view in elevation taken along the line 5—5 of Fig. 3.

Fig. 6 is a representation of a composite photograph that might be produced by this camera shown in reversed relation to the blocked-off views of the film as shown in Figs. 4 and 5.

Fig. 1 shows the front of the housing H of the camera removed, whereas in Fig. 2 portions of the front, back and bottom of the housing H are shown in place. In Figs. 1 and 2 the means for actuating the moving parts of the apparatus is indicated by motor M. The upper compartment of the camera which contains the motivating means and attending apparatus, which is not part of this invention, is separated from the central compartment by shelf A, and the central compartment is separated from the lower compartment and photographic chamber by shelf B. The photographic chamber is a portion of the lower compartment closed in by walls C and D. A block E is centrally located on the bottom of the photographic chamber and mounts a metallic frame suitable for holding a piece of paper, cardboard, or a card in place while the same is being photographed. The shield G cuts down the amount of light passing through opening I.

The primary object or person to be photographed is placed in front of lens 1 which may be manually adjusted for the desired focal distance. Light rays from the person or object being photographed pass through lens 1 to the sensitized surface of the photographic material 2 which is unwound from a roll or reel in case 3 and is wound on a roll or reel in case 4. However, circular shutter 5 interrupts the through passage of the light rays until notch 6 or 7 is rotated into a position directly behind lens 1. For the short time that either of the notches 6 and 7 passes directly behind lens 1, the person or object located in front of the camera and in line with lens 1 is being photographed on the film or other sensitized material 2 standing behind shutter 5 and directly behind lens 1.

The rear lens 8 of the camera is shown in Fig. 2 immediately behind a rotary shutter 9. However, rear lens 8 is not directly behind front lens 1 which fact is illustrated in Fig. 3. Neither are both lenses at the same horizontal level which fact is shown in Fig. 2. The reason for this off center arrangement of lenses will be obvious to those skilled in the photographic art from a study of Fig. 6 which illustrates the type of composite photograph this invention is designed to produce. The photograph of the person appearing in the upper right hand corner of Fig. 6 was taken through front lens 1 on the side of the film exposed to the rays through the front lens. The photograph of the card of information, including his signature and thumb print, if desired, constituting the remainder of Fig. 6, was taken through rear lens 8 on the side of the film 2 exposed to the rays through the rear lens.

A piece of paper or cardboard, or a special card having all the information desired written or printed legibly thereon is placed on block E with the face of the card up so as to be well lighted by a suitable source of light 10. One or more sources of light 10 may be arranged as desired in the photographic chamber so as to fully illuminate the face of the exposed card. Light rays from the card are reflected vertically through opening I in the top of the photographic chamber and are reflected by mirror 11 so as to pass through rear lens 8. The reflected and deflected light rays pass through lens 8 but are interrupted by circular shutter 9. As the shutter is rotated circular openings 12 and 13 pass in succession in front of lens 8. When either opening 12 or 13 is directly in front of lens 8, the light rays reflected from the card and deflected by the mirror impinge on the side of the film 2 exposed to the light rays from the rear lens 8.

The shutter 5 for front lens 1 rotates at the same time and in the same direction as shutter 9 for rear lens 8. The shutters could be operated separately but synchronized so that notch 6 passes behind lens 1 just before circular opening 12 passes in front of lens 8, and likewise notch 7 just before circular opening 13. However, in the embodiment of the invention illustrated in the drawings the two shutters are joined in fixed relation to each other on the shaft 14. Also mounted on shaft 14 is a circular element 15 with prongs or fingers bent horizontally. A spring 16 tends to keep the shaft and the several elements in their proper positions by taking up any slack.

A horizontal disk 17 is keyed to shaft 18 which is connected to motivating means M. Two pins 19 and 20 are secured to disc 17 at predetermined points near its edge. These pins extend down from disc 17 and are revolved by the disc in a counterclockwise direction. As pin 19 meets a finger of circular element 15 it imparts the counterclockwise rotation of disc 17 to the shaft 14. As disc 17 continues to rotate, pin 19 disengages from the bent finger of element 15 after shaft 14 has rotated a certain amount and then shaft 14 stops turning. During this said "certain amount" of counterclockwise rotation of shaft 14, the notch 6 of shutter 5 will have been moved into and out of alignment with lens 1. Also the circular opening 12 of the shutter 9 has been moved into alignment with lens 8 where it will remain when shaft 14 ceases turning. As the notch 6 passes the lens 1, the sensitized film or a portion thereof will momentarily be exposed to the light rays emanating from lens 1 and thus this exposure may be characterized as of the snap-shot or fractional second type which provides an exposed film having a normal gamma value tending to soft gradations of detail. This is particularly desirable when an animate subject is being photographed, as is generally the case at this side of the camera. Disc 17 continues its rotation however, until pin 20 meets a bent finger of element 15 and again the rotating disc 17 causes the shaft 14 to rotate. After the shaft has turned part of a complete revolution, pin 20 disengages the bent finger of element 15 and shaft 14 stops turning, but disc 17 still continues to rotate by reason of connection to motor M or other actuating means used. Until the shaft 14 is again rotated as just stated, the circular opening 12 in the rear shutter 9 is held in alignment with the lens 8. Thus this opening 12 permits light rays being reflected from the inanimate object on block E, deflected by mirror 11 and passing through the lens 8, to be directed upon the sensitized film or a portion thereof from the time the opening is moved into alignment with lens 8 until the renewed rotation of shaft 14 moves the opening of the shutter 9 out of alignment with said lens, at which time said light rays are again shut off from the film. Such a prolonged or what is termed "time exposure" is especially desirable where the object to be photographed is an inanimate article such as a printed card under artificial illumination for a "time exposure" provides a negative having a high gamma value and therefore of substantial contrast tending to good reproduction of the photographed card and its contents. Each time pin 19 or 20 engages the bent fingers of circular element 15 the shaft 14 is rotated through part of a revolution and simultaneously the shutters 5 and 9 which are secured to shaft 14 rotate a corresponding amount.

As disc 17 continues to revolve around on shaft 18, pins 19 and 20 will engage in turn sprockets of star wheel 21 and rotate it a definite amount so long as the pins are in contact with the sprockets of the star wheel. When the pins of disc 17 are not in contact with the sprockets of the star wheel 21, the star wheel does not turn. Fig. 3 shows pin 20 as it moves away from the sprocket of star wheel 21 for which reason the latter has stopped turning. Fig. 3 also shows pin 19 in a position just before it engages the bent finger of circular element 15. Star wheel 21 is secured to a drum 22 which has two bands of regularly spaced teeth around it which engage the holes which line the two edges of film 2 at regular intervals. Thus the rotation of star wheel 21 revolves drum 22 and causes the film 2 to advance between the front and rear lenses of the camera.

Film 2, or any other photographically sensitive material which may be employed, by reason of the revolving drum 22 is unwound from a reel or drum enclosed in case 3, moved between the front and rear lenses of the camera simultaneously, and wound on to a reel or drum enclosed in case 4. The movement of the reel or drum in case 4 is also assisted by a pulley connection to the means M used to rotate disc 17 as shown in Figs. 1 and 2. If desired the film need not be collected on a reel in case 4 but may be cut off and developed as individual pictures, or short strips of pictures.

At this point it will be clear to those skilled in the photographic art that an individual sitting in front of lens 1 will be photographed upside down on that portion of the photographically sensitized material which is exposed behind lens 1 by the notches 6 and 7 in shutter 5. So as to restrict the exposure to light rays coming through lens 1 and notches 6 and 7, a brass insert 23 is placed behind webbed plate 24 which blocks off the major portion of film 2 and only allows the light rays to pass through the rectangular cut-out portion 25 in said insert 23 so as to impinge on the film behind. This means of blocking off most of the surface of the film and permitting the photographing of a person sitting in front of lens 1 on a relatively small corner of a section of the film is illustrated in Fig. 4.

In order to block off light rays directed from a card, or any other subject of photography in the photographic chamber of the camera, through rear lens 8 upon the small corner of a section of the film, which already has the photograph of the person sitting in front of lens 1, another insert 26 is placed on the other side of film 2 as shown in Fig. 3. Insert 26 is clearly shown in Fig. 5 which view shows film 2 broken away so as to reveal the portion of the insert 26 which blocks off light from the lower right hand corner of a section of the film which already bears the imprint of the person sitting in front of the camera. The film or material which is photographically sensitive passes between inserts 23 and 26. The result of blocking off light rays coming through the rear lens 8 and taking a picture of the person sitting in front of lens 1, and then taking a picture of the subject of photography in the photographic chamber of the camera while blocking off light rays coming through front lens 1, would be a composite photograph of both subjects of photography on the same film. An example of such a composite photograph is shown right side up in Fig. 6, instead of inverted as it would be when the pictures were taken.

A special feature of this invention is the ability of the operator to take a picture of a person with the front lens, and a second or so later take a picture of any subject of photography that might be placed in the photographic chamber of the machine with the rear lens, and both pictures will be taken on the photographic film without any movement of the film between the taking of the two photographs. In such a case the front shutter is in approximately the relation shown in the drawings to the rear shutter.

The operator can adjust the front and rear shutters on shaft 14 so that the notches 6 and 7 in the front shutter 5 rotate past the front lens 1 at exactly the same time the circular openings 12 and 13 in rear shutter 9 rotate past the rear lens 8. In such a case the machine is capable of taking pictures with both the front and rear lenses simultaneously and without any movement of the photographic film.

When the subject of photography before the front lens is dark, that is, it does not reflect a lot of light which is supplied from other compartments of the machine not shown in the drawings, or the background is dark, or the light in the room is insufficient, the operator will adjust the front and rear shutters so that the circular openings in the rear shutter pass in front of the rear lens before the notches in the front shutter pass in the rear of the front lens. When that adjustment is made the circular openings in the rear shutter will rotate right on by the rear lens, whereas by reason of the location of pins 19 and 20 on disc 17 the notches in the front shutter will hesitate momentarily behind the front lens before rotating past. In that way there is a longer time of exposure for the subject of photography before the front lens which will tend to equalize the light intensities supplied to the film from the front and rear lenses.

In the majority of cases the light reflected from the subject of photography in the photographic chamber and then deflected to the rear lens will be less than the light reflected by the subject of photography before the front lens, for two reasons: (*a*) the light rays which are deflected by the mirror through the rear lens and then have to penetrate through the film to the side of the film which is photographically sensitized lose about thirty-seven per cent of their intensity; (*b*) the compartments of the camera which are not shown completely in Figs. 1 and 2 of the drawings are utilized to house lights with reflectors for flood lighting the subject of photography before the front lens. For those reasons the shutters are usually adjusted on the shaft as shown in the drawings in order to have the rear shutter pause momentarily in front of the rear lens so as to allow a briefly longer time of exposure to the light rays from the photographic chamber.

While the described embodiment of the present invention constitutes a preferred form, it is to be understood that other forms might be adopted, all coming within the scope of the claims which follow.

What is claimed is as follows:

1. In a photographic camera the combination of separate lenses with individual shutters for each lens, means for guiding photographically sensitive material between said lenses comprising thin strips of metal with portions cut out to permit the passage of light rays so as to impinge on opposie sides of said sensitive material, means for causing said sensitive material to move between said strips of metal, means for simultaneously operating said shutters and means for correlating the motion of said sensitive material and said shutters comprising a revolving disc with a plurality of pins extending down therefrom so as to engage successively said means for moving said material and said means for operating said shutters.

2. In a photographic camera, the combination of separate lenses with individual shutters for each lens, means for guiding photographically sensitive material between said lenses comprising contiguous plates each having a window to permit the passage of light rays so as to impinge on opposite sides and different areas of said sensitive material, mean for causing said sensitive material to move between said plates, means for simultaneously actuating said shutters; and means for correlating the motion of said sensitive material and said shutters, said means comprising a rotating disc having depending fingers adapted successively to engage and actuate the material moving means and the shutter operating means.

3. In a photographic camera, the combination of separate lenses; a rotatable shutter for each lens; means for guiding photographically sensitive material between said shutters, said means comprising contiguous masking plates each having a single window to permit light rays to impinge upon prearranged areas of opposite sides of said sensitive material; means for causing said sensitive material to move between said plates a measured distance; means for rotating said shutters; means for correlating the measured movement of said sensitive material and the rotation of the shutters, comprising a rotating disc having depending fingers so disposed as to successively engage and recurrently actuate in timed sequence the material moving means and the shutter rotating means.

4. In a photographic apparatus, the combination with two oppositely disposed lenses; means supporting photographically sensitive material between said lenses; a shutter for each lens, each shutter having a light releasing opening to be moved into registry with its respective lens; a rotatably mounted shaft upon which said shutters are coaxially mounted so that their openings are 45° apart, the initial position of the shaft being such that the first shutter opening is substantially 45° from registry with its respective lens and the second shutter opening is substantially 90° from registry with its lens; a rotor constituting the sole actuator for said shaft; spaced fingers on the shaft; pins on the rotor angularly spaced a greater distance apart than the fingers on the shaft, the relative positions of the shaft and the rotor and the relation between the spacings of the fingers and pins being such that when the rotor is rotated, the pins successively engage the fingers and produce successive 90° rotations of the shaft during the first of which the first shutter opening is moved past its lens and the second shutter opening is moved into full registry with its lens, the second rotation of the shaft moving the second shutter to disalign its opening and the respective lens for terminating its exposure; and means for operating the rotor.

5. In a photographic apparatus, the combination with a carrier supporting photographically sensitive material; of two oppositely disposed lenses, one on each side of the material; an individual disc shutter for controlling the light rays of each respective lens, each shutter having an aperture movable into alignment with the corresponding lens; a rotatable member supporting both shutters so that their apertures are constantly disaligned, said rotatable member having abutments; an actuator, constituting the sole rotating means for said member, said actuator having cam elements engageable with the abutments for operating said member when the actuator is operated, the positions of the shutters on the said member, the spacing of the abutments and the spacing of the cooperating cam elements on the actuator being such that during the cycle of actuator operation successive cam elements engage successive abutments whereby the said member is successively rotated through two separate portions of its cycle of movement, during the first of which the one shutter has its aperture moved past its lens and thereby renders its lens effective to provide a substantially instantaneous light exposure on one side of the sensitive material and the other shutter has its aperture aligned with its lens to initiate a substantially longer time exposure of its lens upon the other side of the material, and during the second portion the said other shutter is rotated to move its aperture from alignment with its lens to terminate its exposure; and means for operating the actuator.

6. In a photographic apparatus, the combination with a pair of oppositely disposed lenses; and means for supporting photographically sensitive material between said lenses and in the path of the light rays passing through said lenses; of a rotatable shaft; an apertured disc shutter for the one lens so secured to the shaft that during one quarter revolution of the shaft from its normal position, the shutter is rotated so that its aperture is moved across the light path of its lens momentarily to release the light rays of its lens; a second apertured disc shutter for the other lens, said shutter being so secured to the shaft, that said second shutter aperture will be moved into full registry with its lens at the termination of the said one quarter revolution of said shaft, and be moved out of registry with its lens during the second quarter revolution of said shaft from normal position; abutments on the shaft; an actuator; spaced engaging means on the actuator engageable with the abutments for turning the shaft in response to rotation of the actuator, the relation between the spacings of the abutments and the engaging means on the actuator being such that during one cycle of rotation of the actuator, successive engaging means engage successive abutments whereby the shaft is rotated through two distinct quarters of a revolution with a predeterminately timed rest interval between said quarter revolution.

7. In a photographic apparatus, the combination with two oppositely disposed lenses; of means disposed between said lenses for supporting photographically sensitive material therebetween; a shutter normally obstructing the light rays from each respective lens, each shutter having a light releasing opening movable into registry with its respective lens; a rotatably mounted shaft upon which both shutters are mounted in a manner normally to displace the opening of the first shutter substantially 45° out of alignment with the opening of the other shutter, the initial position of the shaft being such that the opening of the first shutter is displaced substantially 45° from registry with its lens and the opening of the second shutter is displaced substantially 90° from registry with its lens; a rotor constituting the sole actuator for said shaft; and a motion transmitting connection between the shaft and the rotor, comprising engageable members certain of which are carried by the shaft and others by the rotor, the spacing of the members on the shaft relative to the spacing of the cooperating members on the rotor being such that as the rotor rotates the members thereon will successively engage successive members on the shaft and produce two separate 90° rotations of the shaft with a predeterminately timed rest interval between said rotations.

8. In photographic apparatus, the combination with two oppositely disposed lenses; of a guideway for conveying photographically sensitive material between said lenses; means for causing said material to move through said guideway; two rotatable, perforated disc shutters, each adjacent a lens and normally obstructing the light rays of the respective lens but rotatable to release said light rays; a rotatable member supporting both shutters for rotation therewith and so that their respective perforations are out of alinement; an actuator constituting the sole operating means for said member; abutments on the member; means on the actuator movable thereby into engagement with the abutments and with the material moving means, the relative positions of the shutters on the supporting member, the position and spacing of the abutments relative to the position and spacing of the engaging means on the actuator and the path of movement of the said engaging means relative to the material moving means being such that in response to rotation of the actuator the supporting member is moved through two separate portions of its complete cycle during the first of which the perforation of one shutter is moved past its lens, substantially instantaneously to release the light rays therefrom and the perforation of the second shutter is moved into full light releasing position relative to its lens and during the second portion the said second shutter is moved again to obstruct the light rays from its lens, continued movement of the actuator causing its engaging means to engage and actuate the material moving means; and means for rotating the actuator.

9. In a photographic apparatus the combination with two oppositely disposed lenses, means for supporting photographically sensitive material between said lenses; a disc shutter for each lens, normally obstructing the light rays from said lenses, each shutter having a light releasing opening; a rotatably mounted shaft supporting both shutters so that their openings are out of axial alignment; spaced abutments on the shaft; a rotor; spaced means on the rotor engageable with the abutments in response to rotation of the rotor, the relative positions of the shutters on the shaft, the spacing of the abutments on the shaft and the spacing of the engaging means on the rotor being such that rotation of the rotor causes successive engaging means to engage successive abutments for actuating the shaft through two portions of a revolution with a predeterminately timed rest interval therebetween and such that during the first portion of shaft rotation, the opening of the first shutter is moved past its lens and the opening of the second shutter is moved into full registry with its respective lens and during the second portion of shaft rotation the opening of the second shutter is moved from registry with its lens to terminate the exposure thereby; means for causing the sensitive material to be moved through its support; a lever engageable by the said means on the rotor for operating the material moving means after the closing of the second shutter; and means for rotating the rotor.

10. In a photographic camera, the combination with two oppositely disposed lenses; an individual shutter for each lens, each shutter having an opening, said openings being out of axial alignment; a common member supporting both shutters to provide for their concurrent, coaxial rotation; a multiple prong cam on the common member; a conveyor for guiding photographically sensitive material between said lenses; means for causing said sensitive material to move through said conveyor; a rotatable disc constituting the sole actuator for said shutter supporting member, and means for rotating the disc, said disc having two spaced lugs projecting therefrom, the position of said disc being so related to those of the cam and the material moving means that during one revolution of the disc the lugs successively engage spaced prongs on the cam to rotate the common member, and thereafter engage the material moving means to advance said material, the spacing of the lugs being so related to the spacing of the prongs and the arrangement of the shutters on said common member that the first lug rotates the said member a distance sufficient to open and close one shutter and to open the other shutter, and the second lug further rotates the member a distance sufficient to close the said other shutter.

11. In a photographic camera, the combination with two oppositely disposed lenses; an individual shutter for each lens, each shutter having an opening capable of being aligned with the corresponding lens; a rotatable member supporting both shutters so that their openings are disaligned and providing for their concurrent rotation; a conveyor for guiding photographically sensitive material between said lenses; shifting means for causing said material to move through the conveyor; spaced abutments extending from said shutter supporting member; a rotatable disc constituting the sole actuator for said shutter supporting member; means for rotating the disc; two spaced camming pins projecting from said disc so as to be engageable with said abutments, the position of said disc being so related to those of the abutments and the shifting means for the material that during one revolution of the disc the pins successively engage the spaced abutments on the shutter supporting member to rotate said member and thereafter engage the material shifting means, the spacing of the pins on the disc being so related to the spacing of the abutments on the supporting member and the arrangement of the shutters on said member that the first pin rotates said member a distance sufficient to move the opening of one shutter past its lens and to move the opening of the other shutter into full registry with its lens and the second pin further rotates said member a distance sufficient to move the opening of said other shutter out of alignment with its lens.

12. In a photographic camera, the combination with two oppositely disposed lenses; of a conveyor for guiding photographically sensitive material between said lenses so that their light rays may impinge upon the respective sides of the material; means for causing the material to be moved through the conveyor; a rotatable shaft; an individual shutter for each lens said shutters being constructed and mechanically connected to the shaft so that one shutter is opened before the other as the shaft is rotated; spaced abutments on the shaft; a rotatable cam constituting the sole actuator for the shaft, said cam having spaced actuators successively engageable with the spaced abutments on the shaft so as to impart two separate turning impulses to the shaft, the position of said cam being so related to those of the abutments and the material moving means that during one revolution of the cam its actuators successively engage the abutments on the shaft to rotate it through its two separate portions of a revolution and thereafter engage the material moving means to advance the material in the conveyor, the spacing of the successive actuators on the cam being so related to the spacing of the successive abutments on the shaft that the first actuator on the cam engages one abutment to rotate the shaft a distance sufficient to open and close one shutter and to open the other shutter and the next actuator on the cam engages the next abutment on the shaft for rotating the shaft a distance sufficient to close said other shutter; and means for rotating the cam.

13. In a photographic apparatus the combination with a means for supporting photographically sensitive material; of two lenses, each directing light rays against a respective side of said material; two shutters in the form of apertured discs, each normally obstructing the light rays of a respective lens; a rotatable shaft supporting both shutters so that their apertures are disaligned and in response to rotation of the shaft their apertures successively align with and thereby release the light rays of their respective lenses; an actuator constituting the sole operating means for said shaft; a periodically effective motion transmitting connection between the shaft and the actuator, comprising abutments on the shaft and lugs on the actuator, successive lugs being moved into engagement with successive abutments for operating the shaft, the relation between the spacing of the lugs and the abutments and the positions of the shutters on said shaft being such that the operation of the actuator causes successive lugs thereon to engage successive abutments on the shaft to move said shaft through two separate portions of its complete cycle, the one shutter having its aperture moved past its lens to provide a substantially instantaneous exposure, and the other shutter having its aperture aligned with its lens to initiate its exposure during the first portion of movement of said shaft, the said other shutter being further rotated to move its aperture out of alignment with its lens to terminate its exposure during he second portion of movement of said shaft; and means for driving the actuator.

SPENCER F. MONROE.